Patented Aug. 25, 1936

2,052,073

UNITED STATES PATENT OFFICE 2,052,073

PROCESS FOR THE MANUFACTURE OF NEW CONVERSION PRODUCTS FROM NATURAL RESINS AND ESTERS THEREOF

Josef Binapfl, Krefeld-Uerdingen, Germany, assignor to I. G. Farbenindustrie Aktiengesellschaft, Frankfort-on-the-Main, Germany No Drawing. Application September 1, 1933, Serial No. 687,911. In Germany September 17, 1932

12 Claims. (Cl. 260—3)

The present invention concerns the manufacture of new and useful materials from natural resins or esters thereof and consists in causing volatile halides to act on mixtures of natural resins or natural resin esters with aldehydes. Instead of the resins or esters thereof the resin acids isolated from the same or the esters of these resin acids can likewise be employed.

The new products are distinguished from the starting material in their physical and chemical behaviour, in particular they exhibit in general a higher softening point.

Among the natural resins and esters thereof, which are suitable for the manufacture of conversion products in accordance with the present invention, the following may be specially mentioned:—colophony, pine resin, Batavian damar, gum mastic, copal, as well as esters of these resins with ethyl alcohol, dodecyl alcohol, glycol, glycerine, mannite, phenol and the like. In addition the mixed esters known under the name of alkyd resins and containing the residue of an acid from a natural resin besides the residue of a polyvalent alcohol and a polybasic acid, are well adapted for the manufacture of the new conversion products. As examples of the said alkyd resins may be mentioned the condensation products, obtainable from glycerine, glycol, polyglycols or polyglycerines, pentaerythrite, mannite, sorbite and the like by simultaneous or successive esterification with colophony, pine resin, copal, gum mastic, damar and the like and a polybasic acid, such as phthalic acid, trimellitic acid, succinic acid, maleic acid and the like.

Among the aldehydes appropriate for the purpose of this invention may be mentioned: formaldehyde and polymers thereof, such as paraformaldehyde and trioxymethylene and compounds yielding formaldehyde, such as hexamethylene tetramine, as well as other aldehydes such as acetaldehyde, propionic aldehyde, crotonic aldehyde, benzaldehyde, furfural and compounds yielding these aldehydes etc.

Volatile halides appropriate for the purpose of this invention are e. g. hydrogen halides, titanium chloride, aluminium chloride, tin tetrachloride, boron fluoride etc. These halides are preferably used in a practically anhydrous condition.

Instead of boron fluoride compounds of the same, such as for example, acetato-fluoro-boric acid, formiato-fluoro-boric acid etc., can also be employed as the condensing agents.

When employing solvents those are found most appropriate which in themselves do not undergo a chemical change under the reaction conditions, such as for example, carbon tetrachloride, carbon disulphide etc. Hydrocarbons, such as benzene, toluene, xylene, ligroin, gasoline, tetraline and the like are also suitable as solvents for the purpose of this invention.

The temperature during the reaction may vary according to the conditions. I have obtained good results with temperatures above 0° C., more particularly with temperatures ranging from about 0° C. to about 250° C.

It is worthy of note that the conversion products obtainable in accordance with the present invention by condensing natural resins by means of volatile halides are capable of being esterified due to the presence of free carboxylic acid groups, e. g. by means of alcohols, such as for example, ethyl alcohol, glycol, glycerine, glycol monoethylether, polyglycol, mannite, sorbite, phenol, etc.

The following examples will serve to illustrate the invention; the parts being by weight:

*Example 1*

About 16 parts by weight of boronfluoride are passed by means of a current of nitrogen into a mixture of 300 parts by weight of colophony (acid value 171, softening point 70° C.), 150 parts by weight of xylene and 25 parts by weight of paraformaldehyde in the course of 8 hours at 30° C. while stirring. A dark colored reaction mass is obtained, which after standing for 12 hours at room temperature is diluted with 200 parts by weight of xylene and then neutralized with 60 parts by weight of calcium oxide. After the addition of 15 parts by weight of fuller's earth the mixture is stirred at 40° C. for some 30 minutes. The earthy material is filtered off and the volatile constituents removed from the filtrate by distillation. 310 parts by weight of a bright yellow, clear resin possessing the following constants are thus obtained:

Acid value _____ 148
Softening point _____ 119° C.

*Example 2*

17 parts by weight of boronfluoride are passed in the course of 6 hours at 45° C. into a solution of 500 parts by weight of the glycerine ester of colophony (acid value 7.7, softening point 78° C.) in 250 parts by weight of benzene after the addition of 25 parts by weight of paraformaldehyde. A yellowish brown reaction mixture is thus obtained, which is diluted with 250 parts by weight of benzene after standing for 15 hours and is then neutralized with 65 parts by weight of calcium oxide. After the addition of 10 parts by weight of bleaching earth, known under the name of Tonsil, the whole mixture is well stirred for about 2 hours at 30° C. and the solid constituents are then filtered off. After distilling the volatile constituents from the filtrate 512 parts by weight of a bright, clear resin possessing the following constants are obtained.

Acid value_____ 8
Softening point_____ 113° C.

*Example 3*

20 parts by weight of boronfluoride are passed with good stirring in the course of 7 hours at 50 C. into a mixture of 300 parts by weight of the glycerine ester of colophony (acid value 7.7, softening point 78° C.) 50 parts by weight of crotonic aldehyde and 100 parts by weight of benzene. After standing for some 14 hours the reaction mass is diluted with 300 parts by weight of benzene and after neutralizing by the addition of 32 parts by weight of sodium carbonate and 2 parts by weight of water the mixture is well stirred at 35° C. for about 2½ hours. After filtering off the solid material the filtrate is concentrated. 330 parts by weight of a clear resin possessing the following constants are obtained:

Acid value_____ 10
Softening point_____ 108° C.

I claim:

1. The process which comprises reacting with a material selected from the group consisting of boron fluoride and a compound of boron fluoride upon a mixture of para-formaldehyde with material selected from the group consisting of colophony and an ester of colophony.

2. The process which comprises reacting with boron fluoride upon a mixture of para-formaldehyde with material selected from the group consisting of colophony and an ester of colophony in the presence of a solvent therefor.

3. The process which comprises reacting with boron fluoride upon a mixture of para-formaldehyde with colophony in the presence of a solvent therefor.

4. The process which comprises reacting with boronfluoride upon a mixture of paraformaldehyde and colophony in the presence of xylene at a temperature of 30° C.

5. The process which comprises reacting with boron fluoride upon a mixture of para-formaldehyde with an ester of colophony in the presence of a solvent therefor.

6. The process which comprises reacting with boron-fluoride upon a mixture of paraformaldehyde and colophony glycerine ester in the presence of benzene at a temperature of 45° C.

7. A conversion product of a natural resin obtainable by reacting with material selected from the group consisting of boron fluoride and a compound of boron fluoride upon a mixture at paraformaldehyde with material selected from the group consisting of colophony and an ester of colophony.

8. A conversion product of a natural resin obtainable by reacting with boron fluoride upon a mixture of para-formaldehyde with material selected from the group consisting of colophony and an ester of colophony in the presence of a solvent therefor.

9. A conversion product of a natural resin obtainable by reacting with boron fluoride upon a mixture of para-formaldehyde and colophony in the presence of a solvent therefor.

10. A conversion product of a natural resin obtainable by reacting with boronfluoride upon a mixture of paraformaldehyde and colophony in the presence of xylene at a temperature of 30° C.

11. A conversion product of a natural resin obtainable by reacting with boron fluoride upon a mixture of para-formaldehyde and an ester of colophony in the presence of a solvent therefor.

12. A conversion product of a natural resin obtainable by reacting with boronfluoride upon a mixture of paraformaldehyde and colophony glycerine ester in the presence of benzene at a temperature of 45° C.

JOSEF BINAPFL.